US005634618A

United States Patent [19]

Farmer, Jr. et al.

[11] Patent Number: 5,634,618

[45] Date of Patent: Jun. 3, 1997

[54] SUPPORTS FOR MOUNTING A PLANAR OBJECT BETWEEN OPPOSED SURFACES WITHOUT SUBSTANTIALLY ALTERING THE MOUNTING SURFACE

[75] Inventors: Lonnie W. Farmer, Jr.; Mickey Shedlock, both of Friendswood, Tex.

[73] Assignee: Robert Fee, III, Friendswood, Tex.

[21] Appl. No.: 386,954

[22] Filed: Feb. 10, 1995

[51] Int. Cl.[6] .................... F16M 11/00

[52] U.S. Cl. .................... 248/201; 248/229.26

[58] Field of Search .................... 248/201, 208, 248/218.2, 229.16, 229.26, 228.7, 230.7, 231.81, 302

[56] References Cited

U.S. PATENT DOCUMENTS

| | | | |
|---|---|---|---|
| 1,049,803 | 1/1913 | Boyer | 248/229.26 |
| 2,930,156 | 3/1960 | Jones | 248/229.26 |
| 5,487,690 | 1/1996 | Stoffle et al. | 52/584.1 |
| 5,489,078 | 2/1996 | Risley | 248/231.81 |

FOREIGN PATENT DOCUMENTS

| | | | |
|---|---|---|---|
| 953317 | 11/1956 | Germany | 248/229.26 |
| 461277 | 2/1937 | United Kingdom | 248/229.26 |

*Primary Examiner*—Leslie A. Braun
*Assistant Examiner*—Willie Berry, Jr.
*Attorney, Agent, or Firm*—Rosenblatt & Redano, PC

[57] ABSTRACT

The present invention provides a support for quickly and securely mounting substantially planar objects between substantially opposed surfaces with minimal modification or alteration of said surfaces. The supports of the present invention use the object to be mounted, itself, as a source of pressure which is directed against the mounting surfaces to wedge the substantially planar object between opposed surfaces. The supports of the present invention securely mount a substantially planar object between substantially opposed surfaces without the need for penetration or other alteration of the mounting surfaces using nails, screws, or similar objects. The supports can be used to mount an object permanently or temporarily, as desired.

10 Claims, 1 Drawing Sheet

SUPPORTS FOR MOUNTING A PLANAR OBJECT BETWEEN OPPOSED SURFACES WITHOUT SUBSTANTIALLY ALTERING THE MOUNTING SURFACE

FIELD OF THE INVENTION

The present invention relates to supports for mounting objects between two substantially opposed surfaces. Examples would be brackets for mounting protective coverings for windows, shelving, partitions, and the like.

BACKGROUND OF THE INVENTION

Numerous support structures exist for mounting shelves, partitions, protective coverings for windows, and other planar objects between two substantially opposed surfaces. Most of these support structures consist of a permanent frame or casing which requires time-consuming and often difficult installation. Most, if not all, of the supports in current use permanently alter and may even damage the surfaces on or between which the planar object is mounted. Also, since the installation of such mounting systems is time-consuming, such supports must be installed long before the need to mount the planar object arises.

A support which would securely mount planar objects between substantially opposed surfaces without substantially modifying the supporting surfaces would be highly desirable. Also, the installation of protective coverings, such as storm windows, typically is delayed until a potentially destructive storm is imminent. A support that could be used to quickly mount and effectively secure a protective window covering without substantial damage to the supporting structure would be most desirable.

SUMMARY OF THE INVENTION

The present invention provides a support for quickly and securely mounting substantially planar objects between substantially opposed surfaces with minimal modification or alteration of said surfaces. The supports of the present invention use the object to be mounted, itself, as a source of pressure and directs that pressure against the mounting surfaces to wedge the substantially planar object between opposed surfaces. The supports of the present invention securely mount a substantially planar object between substantially opposed surfaces without the need for penetration or other alteration of the mounting surfaces using nails, screws, or similar objects. The supports can be used to mount an object permanently or temporarily, as desired.

DETAILED DESCRIPTION OF A PREFERRED EMBODIMENT

Figures 1, 2, 3, 4, 5, 6, 7, 8:
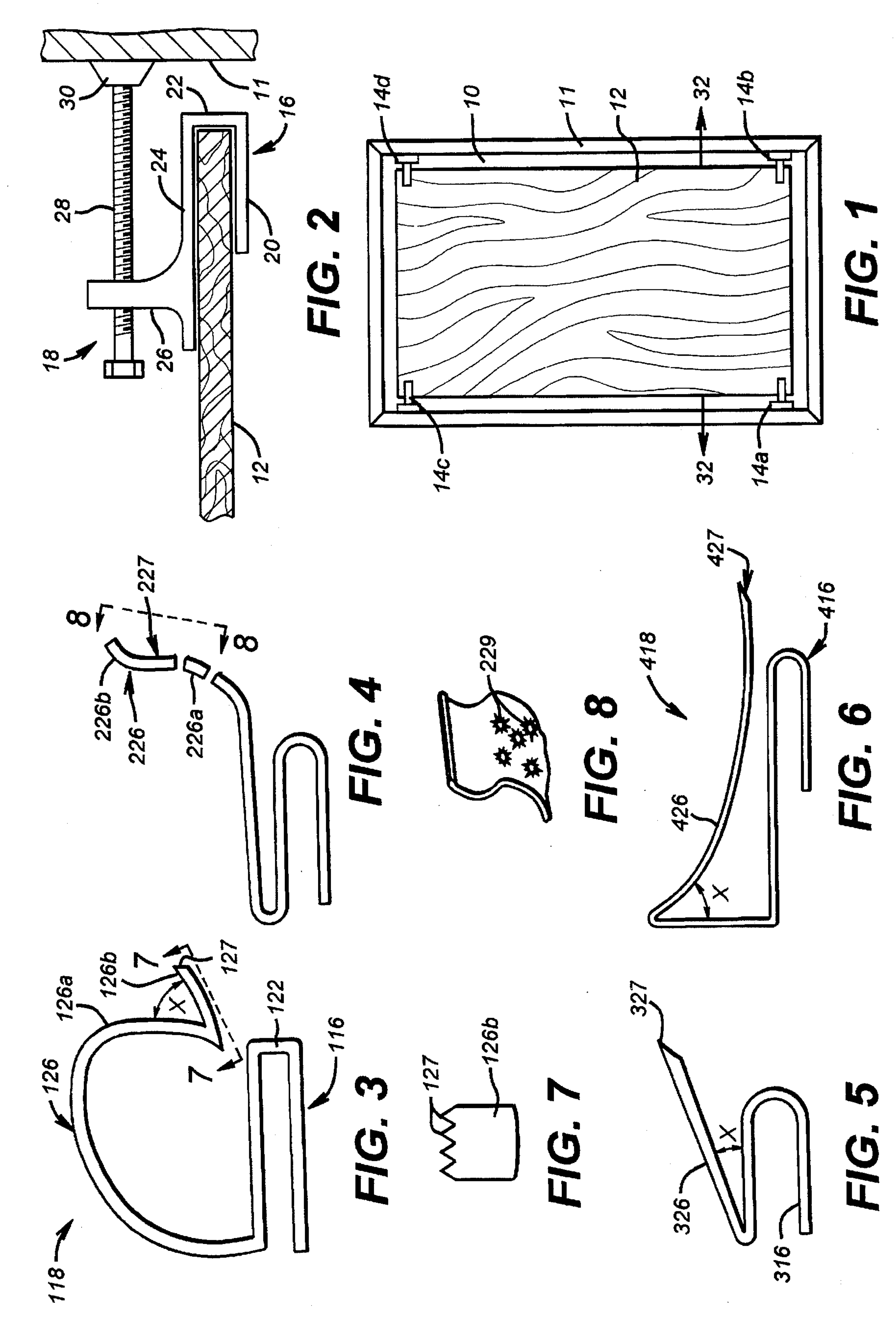
FIG. 1 is a perspective view of a window with a protective covering secured over the window using supports according to the present invention.
FIG. 2 is a cross sectional view of a preferred embodiment of a support holding a protective covering in place.
FIGS. 3–6 are cross sectional views of alternative embodiments of supports according to the present invention.
FIG. 7 is a frontal view taken along line 7—7 of FIG. 3.
FIG. 8 is a frontal view taken along lines 8—8 of FIG. 4.

The present invention will be described with reference to the accompanying drawings. FIG. 1 depicts a window frame 10 in which the window (not shown) is covered by a planar protective covering 12. The protective covering 12 is held in place adjacent to the window frame 10 by four supports 14 *a–d* having a preferred structure such as that shown in FIG. 2. The supports are held in place between the protective covering 12 and the surrounding surface of the building 11 in the following manner.

The four supports 14 *a–d* are shown in more detail in FIG. 2. Each support 18 has a U-shaped "cup" portion 16 formed by three walls—two side walls 20, 24, and a back wall 22. The front wall 20 and the back wall 24 preferably are substantially parallel to one another so that they can form a nesting relationship with a plank of wood or another substantially planar structure. A flange 26 extends radially from the side wall 24 in a direction that is substantially perpendicular to the back wall 24. Although only one flange 26 is shown in FIG. 2, two or more flanges may be provided to strengthen the support 18. A threaded bore (not shown) extends through the flange 26, and a screw 28 is threaded through the bore and extends substantially parallel to the back wall 24. In the embodiment shown in FIG. 2, a foot 30 is mounted on the end of the screw 28 and the screw 28 can be rotated so that the foot 30 abuts the surrounding surface 11. The screw 28 should be long enough for the foot 30 (or the end of the screw 28) to extend beyond the closed end 22 of the cup 16 and engage the surrounding surface 11 while the screw is still held securely in the bore.

The cup 16, flange 25, and screw 28 should be made of durable material which is strong and rigid but also flexible enough to sustain the stress necessary to retain the substantially planar object between the surrounding surfaces 11. The support 18 can be made of a number of materials, such as carbon steel, plastic, aluminum, and other materials having suitable rigidity, durability, and flexibility. A preferred material for the majority of the support 18 shown in FIG. 2 is aluminum, such as 6061-T651 aluminum obtainable from a number of sources, such as TransAlloy, Houston, Tex. The foot 30 can be made of a number of materials, such as metal, a durable plastic, or preferably an elastomer. A preferred material for the foot 30 will depend upon expected conditions of use and the surfaces to be encountered in use. A person of ordinary skill in the art can easily determine the best material for a particular use. For most uses, a preferred material is rubber.

The edge of the protective covering 12 is inserted into the cup 16 of the support 18 along the edge of the protective covering 12. For a small covering which will be subject to only low stress during use, a single support 18 at one edge of a substantially planar object should be capable of wedging the object against an opposed supporting surface. For stronger engagement, at least two supports 18 should be used along at least one edge of the object to be mounted to wedge the opposite edge of the object against the opposed mounting surface. Alternate arrangements also may be suitable, depending upon the object to be mounted, the surrounding surfaces, and the conditions to be expected during use. For example, a stronger mounting might be obtained be placing one support 18 at each opposed edge of the substantially planar object. The strength of the retention can be altered by altering the number and location of the supports 18.

Referring back to FIGS. 1 and 2, after the substantially planar object 12 is positioned with respect to the mounting surfaces 11, the screw 28 in each support is rotated until each foot 30 abuts the adjacent surface 32, which may be brick, woodframe, or other material. The screws 28 should be rotated until the object 12 is held firmly in placed between the opposed surfaces.

As seen from the foregoing, the supports 18 of the present invention are designed to use the edges of the object to be mounted to exert pressure against the mounting surface(s). This pressure holds the object in place between the mounting surfaces without substantially altering the mounting surfaces. The supports may be installed quickly and easily. The precise structure of the supports may vary as long as the supports accomplish the foregoing result. Several alternative embodiments, shown in FIGS. 3–6, will be described using like numerals to designate like structure.

FIG. 3 is a side view of an alternative support 118 which has a cup 116 and a flange 126 comprised of a rounded portion 126*a* and a rim 126*b* extending away from the rounded portion 126*a* at an angle x of preferably 90° or less. The bracket 118 of FIG. 3 preferably is made of a material that is more flexible than the material used to make the bracket 18 of FIG. 2. The material should be flexible enough for the rim 126*b* to be compressed within the rounded portion 126*a* during mounting to a position that is inside of the dotted line 128 representing the outer edge of the closed end 122 of the cup. The material also should be rigid enough (a) for the rounded portion 126*a* to resist deformation so that, upon release, the resilient rim 126*b* will exert sufficient pressure against the surrounding surface to wedge the object held in the cup 116 between opposed mounting surfaces, and (b) for the cup 116 to retain its configuration and hold the object to be mounted in place. Preferred materials for the alternative embodiments shown in FIGS. 3–6 include spring steel and any plastic or other material having suitable resiliency and rigidity. In order to increase the friction between the mounting surface and the rim 126*b*, the end 127 of the rim 126*b* may be serrated, as shown in FIG. 7—*a* frontal view taken along line 7—7 in FIG. 3, or otherwise treated to create ragged edges or surfaces.

Each of the embodiments shown in FIGS. 3–6 uses the resilience of the material used to make the flange to mount the object held by the support between opposed surfaces. The support 218 shown in FIG. 4 has a flange 226 with a curved portion 226*a* and a lip 226*b*. To mount the substantially planar object, the curved portion 226 is compressed toward the cup and away from the mounting surface. Upon release, the resilience of the curved portion 226 forces the curved portion 226 against the mounting surface. In order to increase the gripping strength of the flange 226 shown in FIG. 4, the outer surface 227 of the flange 226 has been punctured to create raw edges 229 along the surface that interfaces with the mounting surface. See FIG. 8, taken along line 8—8 of FIG. 4. The raw edges 229 will grip the surrounding surface more tightly than if the curved portion 226 is smooth.

The embodiment in FIG. 5 has a flange 326 which is simply longer than the body of the cup 316. To mount an object held in the cup 316, the flange 326 is forced away from the cup 316, increasing the angle x. Upon release, the flange 326 and cup 316 move toward one another, decreasing the angle x and exerting pressure at the end 327 of the flange.

The bracket 418 in FIG. 6 is similar. To mount an object held in the cup 416, the flange 426 is forced inward toward the cup 316, decreasing the angle x and causing the flange 426 to become more concave. Upon release of the end 427, the resilience of the flange 426 forces the end 427 of the flange against the surrounding surface.

Many modifications and variations may be made to the embodiments described herein and depicted in the accompanying drawings without departing from the spirit of the present invention. Accordingly, it is understood that the embodiments described herein are illustrative only and are not intended to limit the scope of the present invention.

I claim:

1. A support assembly for mounting a substantially planar object between opposed first and second mounting surfaces to cover an opening there between, comprising:

a first and second opposed mounting surfaces forming at least a portion of an opening;

a planar object;

a cup nestingly engaging an edge of said planar object, said cup having an outer surface at a closed end defining an outer dimension; and a movable member mechanically connected to said cup where an end portion of said movable member exerts a substantially transverse for against the first mounting surface to wedge said substantially planar object in said cup between said first mounting surface and said second mounting surface.

2. The support assembly of claim 1 wherein said movable member comprise:

a flange extending radially outward from said outer surface of said cup and having a threaded bore therethrough; and a screw threadingly engaged in said bore at one end and reciprocally movable relative to said cup such that a second end of said screw extends beyond said closed end of said cup to engage said first mounting surface.

3. The support assembly of claim 2 further comprising a foot mounted on said second end of said screw.

4. The support assembly of claim 3 wherein said foot comprises an elastomer.

5. The support assembly of claim 2 further comprising:

a second flange extending radially outward from said outer surface of said cup substantially aligned with and parallel to said first flange and having a second threaded bore therethrough adapted to threadingly engage said screw.

6. The support assembly of claim 1 wherein said movable member is compressible to a position within said outer dimension of said cup and releasable to protrude beyond said outer dimension of said cup to engage said first surface.

7. The support assembly of claim 6 wherein said movable member comprises an engaging surface adapted to tightly grip said first surface.

8. The support assembly of claim 1 wherein said movable member comprises an engaging surface adapted to tightly grip said first surface.

9. A method for mounting a substantially planar object between substantially opposed first and second surfaces comprising the steps of:

providing a substantially planar object having first and second opposed ends;

mechanically engaging a first support with the first end of a substantially planar object;

orienting said substantially planar object between and substantially perpendicular to first and second opposed surfaces, said first end disposed adjacent said first opposed surface and said second end disposed adjacent said second opposed surface;

extending a gripping member on said support toward said first opposed surface, said gripping member engaging and exerting a force against said first opposed surface, resulting in the exertion of force in a substantially opposite direction, said gripping member transmitting said force through said substantially planar object and to said second opposed end, thereby wedging said substantially planar object between said first and second opposed surfaces.

10. The method of claim 9 further comprising the steps of:

mechanically engaging a second support with said second opposed end of said substantially planar object;

extending a second gripping member on said second support toward said second opposed surface, said second gripping member engaging and a force against said second opposed surface, resulting in the exertion of force in a substantially opposite direction, said second gripping member transmitting said force through said substantially planar object and to said first opposed end.

* * * * *